Jan. 19, 1954  W. W. ODELL ET AL  2,666,526
PROCESS AND APPARATUS FOR SEPARATING MIXED MATERIALS
Filed Feb. 2, 1951
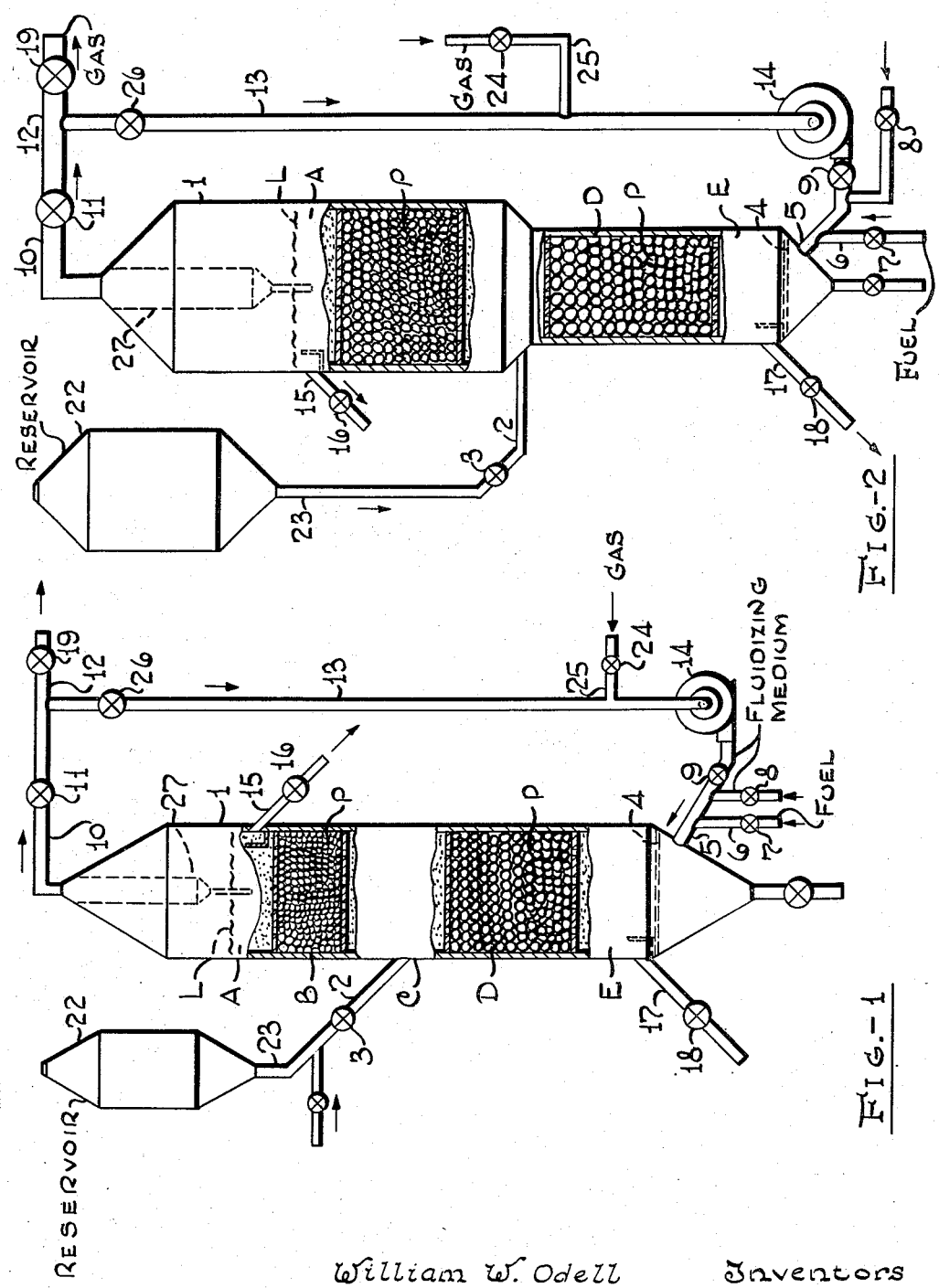
William W. Odell
George L. Matheson  Inventors
By J. Cashman  Attorney Patented Jan. 19, 1954

2,666,526

UNITED STATES PATENT OFFICE 2,666,526

PROCESS AND APPARATUS FOR SEPARATING MIXED MATERIALS

William W. Odell, New York, N. Y., and George L. Matheson, Union, N. J., assignors to Standard Oil Development Company, a corporation of Delaware Application February 2, 1951, Serial No. 209,118

8 Claims. (Cl. 209—474)

This application is a continuation-in-part of the co-pending application of William W. Odell and George L. Matheson Serial No. 726,530 filed February 5, 1947 now abandoned for "Process and Apparatus for Separating Mixed Materials."

This invention relates to a process and apparatus for separating mixed materials. In particular the invention deals with the separation of mixtures of finely divided solids into their component parts, or to the separation from such mixtures of at least one of the component parts, in a commercially pure state. More specifically our invention relates to the separation of mineral matter from crushed ore; to the benefication of coal by the reduction of its ash content, and to similar separations where the solids are in a sufficiently fine state of subdivision so that they can be fluidized, while confined in a separator, by a suspending upflowing fluid stream.

In the separation of foreign matter or gangue material from mineral matter, such as the separation of siliceous matter from a metal sulphide, the two being associated in an ore as mined, various attempts have been made to promote better separation by the use of flotation methods, washing, by jigging on a vibrating table and by electrostatic means. However it has been found that in the treatment of coal and other mixed solids these methods are expensive and in many instances economically prohibitive. Although it has been found that coal can be floated on a mass of fluidized sand and its ash content reduced, this process is not in general use because the amount of improvement is not sufficient to justify the expense of the process. Our studies of this problem have revealed that in order to obtain a high degree of separation of materials by employing fluidized-solids technique, it is quite essential that the mixed solids to be treated be in a fine state of subdivision. We have found that the sand flotation process in which the raw coal is fed on top of a mass of fluidized sand is not desirable, since there is appreciable mixing of the sand and the fine size coal. Also very appreciable amounts of the coal fines are carried away entrained in the gasiform fluidizing media. Furthermore, the gasiform stream which is customarily air forms an explosive mixture when laden with particles of finely divided coal.

Our studies have shown that mixtures of finely divided solids can be separated one from another employing fluidized-solids technique, but that such separation can be conducted to best advantage under a particular set of conditions. It is with these conditions with which our invention deals.

One of the objects of this invention is to separate from mixtures of finely divided solids one or more components in an appreciably more concentrated condition than in the mixture without the loss of appreciable amounts of the valuable component in process. This is accomplished by a procedure which might be classed as fractionation. In the course of this fractionation advantage is taken of the difference in buoyancies of various finely divided solids when fluidized as a bed in a separator.

It is also one of the objects of our invention to treat a material such as coal, while in the finely divided state, in such a manner that the moisture content is reduced and the ash content simultaneously reduced.

Another object of our invention is to treat coal while in a fine state of subdivision so that the ash and moisture contents are reduced and the temperature of the coal itself raised to a predetermined elevated figure, which temperature may be as high as that required for promoting carbonization or partial carbonization. Other objects will become manifest from the disclosures made hereinafter.

In general this invention comprises fluidizing a mass of the material to be treated while in a finely divided state and while confined in a separator. The said mass is confined in a deep bed in the separator and the finely divided solids to be treated are continuously fed as a stream into the fluidized bed preferably at a level between the top and bottom thereof. The most buoyant components are continuously withdrawn from substantially the top of said bed, while the least buoyant components are withdrawn continuously from adjacent the bottom of said bed. A fluid stream, preferably an aeriform or gasiform fluid stream is passed upwardly through the bed at a sufficient velocity to maintain the particles of solids therein in a state of ebullient motion. The gasiform stream is discharged overhead. Means are provided for securing a sharper separation of the mixture into its components which make possible the use of deeper beds than those heretofore employed. These means also aid in increasing the capacity for a given size separator and increase the efficiency for a given size separator. These means will be more specifically defined herein. The invention can be more clearly understood by reference to the figures illustrating embodiments of the same.

Figure 1 shows diagrammatically in elevation but largely as a flow diagram one type of separator in which the process of this invention may be practiced. Means for supplying the solid material to be treated in a fine state of subdivision are also shown as well as means for the discharge of solids from an upper and from a lower zone of the fluidized bed. In addition means for introducing a gasiform stream for fluidizing the solid material, means for the discharge of the aeriform stream overhead, and means for circulating a portion of the latter stream back to the separator are illustrated.

Figure 2 shows diagrammatically in elevation but largely as a flow diagram a modification of the separator shown in Figure 1, which modification is particularly adapted for use in separating materials which have markedly different specific gravities and buoyancies.

Referring specifically to Figure 1, separator 1 comprises: a substantially vertical column, inlet means 2 with control valve 3 for charging a mixture of finely divided solids, a porous plate or grid 4 through which a fluidizing stream admitted through line 5 passes, means for discharging the fluidizing stream overhead through offtake 10, valve 11, conduit 12, and valve 19. Conduit 13 connecting with circulating pump 14 provides means for recirculating as much of the fluidizing stream passing through 11 as is desired back into the separator through control valve 9. A supply of auxiliary fluidizing medium may be supplied through valve 8. The upper level of the fluidized bed is maintained at point L. The substantially continuous discharge of the most buoyant component of the feed mixture is from the top level of the bed through offtake 15 and control valve 16, while the least buoyant solids are withdrawn substantially continuously through offtake 17 and valve 18. Conduit 13 has a control valve 26 and separator 1 has an internally confined dust separator 27. The letters A, B, C, D and E refer to zones in the separator or the fluidized bed. In zones A, C, E the particles of the finely divided solids are free to substantially unlimited ebullient motion, whereas in zones B and D, are packed zones containing solids P having a larger size than the largest of the solids to be separated, which solids are maintained in zones B and D in non-fluidized state. These solids are preferably spherical in shape and so disposed and arranged as to provide interstitial spaces within which spaces the material to be fluidized is formed into a fluidized mass by the fluidizing medium. The particles are restricted as to degree of freedom of ebullient motion within zones B and D. It is understood that the depth of the packed zones B and D may be adjusted at will to suit the requirements in treating any particular mixture of materials. Similarly the size of the non-fluidized solids, or packing material, used in zones B and D may be the same or different in the two packed zones.

Again referring specifically to Figure 1 and considering as a simple example the reduction of the ash content of coal, the operating procedure is as follows: raw finely divided coal, in this example crushed to pass an 8 mesh screen, is fed into the separator 1 from the reservoir 22 through conduit 23, valve 3, and inlet 2. After an appreciable depth of the coal has accumulated in the separator, a fluidizing stream, in this case air, is admitted through valve 8 and inlet 5 at such a velocity that the mass of fine coal in the separator is fluidized, the air stream passing out through 10, 11, 12, and 19. This operation is continuous and the coal is continuously fed into the separator until the bed level builds up to L. When this point is reached, valves 16 and 18 are opened sufficiently so that synchronized amounts of solids pass out through them substantially continuously. The major portion of the coal fed will pass out through 15 and 16, whereas the ash, bone, slate and other non-coal solids, pass out through offtake 17 and valve 18.

With a particular coal, when the ash content of the coal was 10 per cent, it was possible to operate with a high rate of feed through 3 and 2 and to withdraw substantially 95 per cent of the weight of the coal thus introduced through offtake 15 and valve 16, and to remove 5 per cent which was substantially and entirely bone, ash, and non-coal material, through offtake 17 and valve 18. Valves 16 and 18 were adjusted initially so that these relative amounts of ash and coal were discharged as described, but the total amount removed through valves 16 and 18 was and must be at the rate substantially equal to the rate of feed of the raw coal to separator 1 through valve 3 and conduit 2. Thus, in the separation of coal and ash, or of coal from other non-coal material, the process in essence comprises floating coal of low ash content on a bed, which comprises substantially ash material, maintaining meanwhile an intermediate zone, but all in the common fluidized bed, confined in a separator which zone comprises a mixture of the coal and ash particles substantially in ebullient motion. It has been found preferable to introduce the coal to be treated into this particular zone. Normally this zone is substantially the middle zone of the fluidized bed, that is, about half way from the top to the bottom. However, there are conditions in which it is preferable to introduce the coal at higher or lower levels than the middle zone, although when the fluidized bed is very deep, the location of the coal fed somewhat above or below the middle zone has little influence on results. With a shallower bed it is found, in operating with a high thruput, that locating the feed at a level appreciably below the middle zone results in a further decrease in the ash content of the coal discharged through 15 and valve 16, but it also tends to increase the amount of coal with the ash through 17 and 18. In this latter case it may be said that the efficiency of cleaning the coal was increased, but the efficiency of the process was decreased. It will be obvious that to promote different effects the inlet for feeding the coal to the separator may be variously located, but it should be located between the top and bottom of the fluidized bed in the separator, and preferably not far either direction above or below the middle zone.

Thus far the operation has been described with reference to employing air as the fluidizing agent, although experience has shown that there is considerable hazard because of possible explosions when air is used and the coal is very finely divided. Means are shown in Figure 1 whereby this hazard may readily be eliminated by the recirculation of a gasiform fluid from the discharge offtake back into the separator. In this case the gaseous stream passing out through 10 and 11 is at least in part drawn through valve 26 and conduit 13 by pump 14, and forced through valve 9 and conduit 5 through the bed of finely divided solids as the fluidizing media. Additional gas is supplied as desired or as required through valve 24 and conduit 25. In this manner any desired gas may be employed as a fluidizing means, choosing preferably one which has an oxygen content sufficiently low so that explosion hazards are eliminated. Gases suitable for this purpose include stack gas from a boiler plant, producer gas, other combustible gas, nitrogen, carbon dioxide, or mixtures thereof which cannot be exploded at the temperature employed in the operation of the process. In the operation of the process employing recirculation of gases, valves 11 and 9 are open, and valve 19 may be entirely closed unless appreciable additional amounts of steam or gas are introduced into the system as through valves 8 and 24, in which case valve 19 may be opened sufficiently to allow the desired results to be obtained and to allow for the discharge of a predetermined amount of gaseous products therethrough.

The operation may be conducted under normal superatmospheric or under sub-atmospheric pressures. However, it has been found that when employing pressures sufficient to maintain the solids, coal and ash in this example, in a satisfactory fluidized condition in the bed confined in separator 1, there is very little to be gained ordinarily, by operating under pressures greater or less than these amounts.

The rate of feed of coal to the separator through 3 and 2 may be varied over an appreciable range, but normally it will be found that satisfactory results can be obtained within the range of 0.25 to 2.50 pounds of solids per square foot of sectional area of the separator per second. Other factors remaining the same, it will be observed that the duration of the residence time of the coal and the accompanying ash in the separator increases as the rate of charge or feed of the coal to the separator is decreased; obviously there is no bottom limit as to the rate of feed of coal. In order to obtain maximum capacity, one naturally increases the rate of feed of the coal to a maximum. It has been found that as the rate of feed of coal is increased, other factors remaining the same, the efficiency of the process and the percentage reduction of ash in the coal discharged tends to decrease. This decrease in efficiency and increase in the ash content of the coal discharged through 15 and 16 can be offset by increasing the depth of the bed fluidized, meanwhile supplying the coal at a zone about midway top and bottom of the bed.

Again the sharpness of separation and the readiness with which ash will separate from coal depends on a number of other factors, including the nature of the ash itself which may comprise largely pyrite which has a very high specific gravity and which is more readily separable than certain other materials. It will appear therefore that an upper limit of about 2.5 pounds of solids per square foot of sectional area of the separator is not a top limit for all sets of conditions. For normal operations where it is desirable to remove an appreciable amount of the ash from coal, a bed of about 20 to 25 feet in depth is sufficient and an operating rate of 0.25 to 2 pounds of coal fed per second per square foot of separator sectional area, according to the nature of the coal treated, is satisfactory. It is frequently desirable to increase the de-ashing effect by employing finer size particles of coal. In the example thus far cited, the coal employed was found to pass an 8 mesh sieve, but in some cases grinding to finer sizes results in producing purified coal with an appreciably lower ash content than in the foregoing example. This is not always true because it depends upon the separation of pure coal substance from the non-coal substance by grinding.

Again referring to Figure 1, the velocity of flow of the fluidizing stream through the bed of coal in the separator is a function of the size of particles fluidized and other factors, but these conditions are so well known in the art that it is perhaps not necessary to define them here. It may be said, however, that the velocity of the fluidizing stream must be greater, fluidizing a bed of relatively large size particles, than when fluidizing finer size particles; the linear velocity will vary appreciably from about 0.3 foot per second for very fine size particles to 4.0 feet per second for coarse particles and will be higher for larger size particles. In the foregoing example a satisfactory velocity of the fluidizing stream is 2.5 to 3.5 feet per second.

Thus far the de-ashing effect only has been considered, but when it is desirable to expel moisture simultaneously with the de-ashing of coal, it is necessary that heat be applied to the fluidized coal in process in the separator. This may be accomplished by introducing the fluidizing stream at an elevated temperature. A very convenient way to do this is to burn gas or other fuel in the fluidizing stream in sufficient amounts to raise the temperature of the fluidizing stream to the desired or necessary elevation. Although this may be done by promoting the combustion within the bottom of the fluidized bed, it is sometimes desirable to introduce gas or other fuel, as through 6 and 7, and burn it in air supplied through valve 8 or valve 9 or both, in the base of the separator whereby the fluidizing stream passing upward through the bed has a temperature which will be gradient through said bed but it should be above or about 212° F. as it leaves the top of said bed; the amount of fuel burned is controlled so that the temperature of the gas stream leaving the fuel bed is at this point, namely about 212° F. In this manner the coal is to a large extent de-ashed and the free moisture content is reduced to substantially zero. With lower temperatures in the outgoing gas stream the moisture content of the coal will be proportionately above zero. It is found in operating a separator as described and in attempting to obtain maximum capacity of the separator, small amounts of combustible matter tend to pass out of the bed with the ash.

This combustible matter advantageously may be utilized for the heating operation; in other words this combustible matter may be burned for the purpose of heating the fuel in the upper portions of the fluidized bed and, under the conditions, at no extra expense, since the combustible matter otherwise discharged with the ash is not utilized. Thus it will appear that at high capacities it is just as economical to remove moisture from coal as well as the ash. One can readily carry this operation a step further and remove some of the volatile matter initially present in the coal; this is accomplished by promoting such an amount of combustion in the bottom zone of the fluidized bed that the gas stream passing out of the said bed at the top thereof has a temperature higher than 212° F. The desired temperature in this case will be that which corresponds to the amount of volatile matter which it is desirable to leave in the treated coal. Using moderate to high grade coals, very little volatile matter is evolved up to about 480° to 570° F. Hence, in treating coal for the purpose of partly de-volatilizing as well as de-ashing, it is desirable that the coal in process be heated above about 570° F. before it is discharged through offtake 15 and 16. The temperature of the coal as discharged may be chosen to suit any particular effect desired in any prevailing set of conditions. It should be noted, however, that with coals of strong coking properties there is a definite temperature range wherein the coal becomes plastic and difficulties may be experienced when such a coal is heated to the latter temperature, unless special conditions are provided to avoid them.

An appreciable amount of exothermic reaction occurs when coal is heated to about 700° to 750° F., whereas the plastic range of such a coal is commonly 770° to 875° F. In certain instances in the preparation of coal for use in carbonization, it is highly desirable to remove the moisture, decrease the ash content and preheat the coal to a chosen temperature commonly within the range of 250° to 500° F., and this can readily be done by conducting the operation as described, circulating some of the gases through 11, 26, 13, 14 and 9 in amounts found desirable for the double purpose of controlling explosion hazards and for preventing the solids in the lower zone of the bed from becoming heated above the ash softening temperature.

It has been found in the course of our investigations, that in order to obtain maximum capacity (coal thruput) in the operations described, it is desirable to provide means whereby the particles in the fluidized state in separator 1, which particles assume ebullient motion in the bed, are retarded in their motion to such an extent that mixing from top to bottom and bottom to top does not occur. In the carrying out of the process of this invention most effectively it is desirable that the zone in which the coal is fed into the separator be substantially free of packing whereby the particles of solids therein are in free ebullient motion, whereas it is desirable that the zones immediately above and below the feed zone or middle zone contain non-fluidized packing. When the packing comprises supported spheres, the spheres must be of such a diameter that the solids can be fluidized in the interstitial space between them; for sizes finer than 20 mesh, spheres 1 inch in diameter may be employed, whereas with extremely fine size coal smaller spheres may be used. It is sometimes advantageous to use smaller spheres in the upper portion of the separator than in the portion adjacent the bottom. In the lower zone of the separator the spheres or other packing solids function also as a means of maintaining uniform temperature in the combustion zone. It will be observed that the plane of demarcation between the lower mass of fluidized solids which mass is largely ash and the upper layer which is largely coal need not necessarily be in the middle zone or zone in which the raw coal is fed. It can be either above or below this zone; when it is above this zone the coal particles in separating from the ash work their way upwardly through the fluidized mass of ash material, and the ash particles in the coal as fed work their way downwardly into the lower zone of the fluidized mass. The plane may be maintained at a chosen level which will permit the efficiency desired or the ash reduction sought. Before passing on to the citation of other examples, attention is called to the fact that it is normally not possible in ordinary practice to maintain a temperature gradient from bottom to top of a bed of fluidized solids confined in a chamber but, on the contrary, the temperature is quite uniform throughout the bed; the introduction of the packed zones in the separator makes possible a temperature gradient condition. Accordingly the location of the coal-feed inlet to the separator should be considered with reference to the temperature desired in the discharged treated coal through 15 and 16 as well as other factors.

Considering the treatment of a copper ore commonly known as chalcocite ground to a degree of fineness required to separate it from the gangue material, which material is siliceous in nature and has a specific gravity of 2.4 to 3.0, and separating it in this finely divided state from the said siliceous material, the procedure in general is substantially as described for coal with certain basic differences. In this instance the material desired as an end product has a density and specific gravity appreciably greater than that of the gangue material with which it is associated and accordingly it is removed from the separator at the bottom and the gangue material which is of less value is removed from the top of the bed. Chalcocite has a specific gravity of approximately 5.7 and it separates very readily and rapidly from the siliceous material when it is fluidized in a separator. The same technique is employed as described for the treatment of coal, namely, the crushed ore is supplied in a finely divided state commonly 60 mesh and finer to a zone of the bed between the top and bottom thereof and the fluidizing stream which, in this instance, can be air or other gas is passed upwardly through the bed at a velocity adapted to maintain the whole bed in a fluidized state.

Because, other factors remaining the same, a much higher stream velocity is required in fluidizing the chalcocite than in fluidizing siliceous matter which is commonly associated therewith, there would normally be an excessive amount of siliceous fines carried over from the top of the fluidized bed in this example unless special means are provided to prevent it. One such means is to place small size packing, consistent with the size of particles employed, in the lower zone of the fluidized bed and to employ large size packing or no packing at all in the uppermost zone of the separator. The bed density of a given solid material fluidized in a fine state of division in a packed column, other factors remaining the same, increases as the size of the packing material increases. Hence, the undesirable effect of simultaneously fluidizing solids for such a wide density differential can be minimized by a choice of size of the non-fluidized solids used. Another means of facilitating smoothness of operation in this particular case is to line the separator in the lower portion thereof, that is, make the internal diameter of the separator smaller in the bottom zone than in the upper zone; in this case it is desirable to maintain the plane of separation of the two materials, mineral and gangue at substantially the top of the narrow zone.

Referring particularly to Figure 2, the lower portion of separator 1 is shown to have a smaller diameter than the upper portion thereof. In Figure 2 the same system of numbering is employed, like numbers refer to like parts. The operation, referring to this figure, and treating chalcocite of 60 to 200 mesh size, is as follows: The ground ore is introduced into separator 1 through valve 3 and conduit 2 at a point as shown between the top of the bed and the bottom thereof, and a supply of air is forced into the bottom of the separator through valve 8 at a velocity adapted to maintain the ore particles in a state of ebullient motion as a fluidized bed therein. In this instance the gas stream passing off from the top of the fluidized bed is air and unless the operation is conducted under pressure, there is little use in recirculating the air; hence, the offtake gas can pass through 10, 11, 12 and 13 without recirculation. The valves 16 and 18 are regulated in accordance with the amount of mineral and the amount of gangue material in the ore as fed, but the total amount of solids passing through 16 and 18 is substantially equal to that of the ore fed to the separator through valve 3. Again, when difficulties are experienced because of the wide difference in the specific gravity of the different solids fluidized, these difficulties can largely be overcome by adjusting the relative depths of the different materials fluidized in the bed. For example, in this particular case treating chalcocite, the separation of the mineral from the gangue is so rapid and so complete that a shallow or thin layer only need be maintained in the separator, the major portion of the bed fluidized therein can comprise the gangue material. This is accomplished by controlling the initial relative rates of discharge of solids through valves 16 and 18.

In some cases in treating mineral matter, ground ores and the like, the materials are not in a sufficiently dry state that they will flow readily through packing in a separator. In such cases or in cases where it is desirable to eliminate water from the solids being treated, this can be done as in the case of drying coal by introducing fuel through valve 7 and intake 6, and burning it in the gas stream used to fluidize the solids in separator 1. The amount of combustion so conducted is regulated to provide the desired temperature in the outgoing gases passing through 10 and 11. The moisture expelled from the ore, in this case, passes out in the vapor phase with the gases leaving separator 1 through 10 and 11.

In view of the foregoing it will become evident to one skilled in the art that modifications can be made in operating procedure and in the shape of the separator whereby particular effects can be obtained in the treatment or separation of any particular mixture of finely divided solids.

Before defining our claims attention is called to the fact that the heating operation described in the foregoing is subject to considerable modification within the scope of this invention. It has been found to be more economical in general to promote combustion reactions for the purpose of heating the fluidized solids in the separator, in the lower portion of the separator, but it will be understood that combustion can be promoted in zone C by introducing air or air and fuel in zone C. Means for accomplishing this are not shown for the purpose of simplicity. Again, it has been found to be advantageous under some conditions to introduce extraneous matter, such as finely divided siliceous matter, along with the material to be treated into zone C; this is particularly beneficial when the amount of siliceous matter present in the feed material is small. It is sometimes desirable to circulate some of, one or the other, of the end products, initially separated through offtakes 15 and 17 back into the feed supplied to zone C, for the purpose of improved beneficiation of the end product sought.

With a particular Pittsburgh seam coal we found that the minimum fluidizing stream velocities, for different size particles, were somewhat greater than the following:

| | Feet per second |
|---|---|
| 5 mesh size | 2.00 |
| 8 mesh size | 1.80 |
| 12 mesh size | 1.50 |
| 16 mesh size | 1.00 |
| 20 mesh size | .70 |
| 30 mesh size | .45 |

Although particles of various sizes may be fluidized in the practice of this invention, it is usually found that crushing to fine sizes, 60 mesh and finer, makes possible more complete separation of the buoyant and less buoyant particles. For sharpest separation it is desirable that the percentage amount of particles of sizes approaching the maximum and minimum of a given mixture should not be large. To minimize grinding costs it is sometimes desirable to separate by screening or other means, the crushed materials to be treated, and treat the larger sizes, say $\frac{1}{8}$ to $\frac{1}{4}$-inch material, at one time or on one "run" and treat sizes say $\frac{1}{8}$ to $\frac{1}{64}$-inch material on another "run" and the smaller sizes at another time. Although this procedure is not necessary, it sometimes makes possible more efficient separation and an economical procedure.

When air is blown through a bed of powdered solids, static charges are developed on the particles and spark discharges in the fluidized bed are quite common. Accordingly, in fluidizing a bed of finely divided coal it is hazardous to use air as the fluidizing agent; this also applies to other combustible solids in a very fine state of subdivision. The inventors prefer to either recirculate a gas stream of low oxygen content or to use a gas without recirculation which will not form explosive mixtures with such materials as coal dust. When combustion is promoted in the gaseous stream in the bottom zone of the fluidized bed, zone E, the gases passing up through the bed in the other (upper) zones as the fluidizing agent will usually be a safe fluid to use.

In separating mixtures of grain seed into components, drying is accomplished at the same time when desired by controlling the temperature of the hot gases (air) passed up through the fluidized bed; 120° F. is usually sufficient but higher temperatures may be used according to subsequent use of the seed. Germ proofing can also be accomplished simultaneously by controlling both temperature and gas composition. These phases, it is believed, come within the confines of this invention.

What is claimed:

1. A continuous process of separating a mixture of finely divided solids containing particles of different sizes and densities, which comprises providing an elongated vertical separation zone, providing two vertically spaced beds of fixed solids of a size substantially larger than the largest of the said mixture of said finely divided solids, the last named solids being so disposed and arranged as to provide a plurality of interstitial spaces between them of dimensions such that said finely divided solids can be fluidized therein, the vertical space between said beds of fixed solids providing a zone where the finely divided solids can be freely fluidized continuously feeding said particles of finely divided material to said free fluidizing zone intermediate the said beds of larger sized solids, causing a gasiform material to flow upwardly through said elongated separation zone at a velocity of about 0.3 to 4.0 feet per second to cause turbulent fluidization in said free fluidizing zone, to maintain the particles of finely divided material in the form of a dense fluidized mass in the interstitial spaces of said bed of solids without causing fluidization of said substantially larger sized solids, and to permit particles of greater buoyancy to pass upwardly from said free fluidizing zone through said separation zone and to permit particles of less buoyancy to pass downwardly, continuously withdrawing finely divided particles of greater buoyancy from an upper portion of said separation zone and continuously withdrawing particles of less buoyancy from a lower point in said separation zone.

2. The method set forth in claim 1 in which the gasiform material effecting fluidization of the said finely divided solids is heated.

3. The method set forth in claim 1 in which the substantially spherical solids in the lowermost bed are of greater size than those in the uppermost bed.

4. A continuous process of beneficiating low grade coal to separate therefrom gangue, slate and similar impurities which comprises, first, continuously feeding finely divided coal into an intermediate free fluidizing zone of an elongated vertical separation zone containing two fixed vertically spaced beds of non-fluidized solids having a substantially larger size than the largest particles of said ground raw coal, the said substantially larger sized solids being so arranged and disposed as to provide a plurality of interstitial spaces in said beds of sufficiently large dimensions that said finely divided coal can be fluidized in said spaces, causing a gasiform material to flow upwardly in said elongated separation zone at a velocity of about 0.3 to 4.0 feet per second to cause turbulent fluidization of said coal in the vertical space between said beds, to maintain the particles of finely divided coal in the form of a dense fluidized mass in the interstitial spaces of said bed of solids without causing fluidization of said substantially larger sized solids, and to permit particles of lesser buoyancy comprising primarily the denser impurities in said coal to pass downwardly through said separation zone and particles of greater buoyancy primarily comprising said coal to pass upwardly, continuously withdrawing finely divided particles of greater buoyancy comprising coal from an upper portion of said separation zone and continuously withdrawing particles of less buoyancy comprising the impurities from a lower point in said separation zone.

5. The method set forth in claim 4 in which the fluidizing gas is a combustible gas, and further, wherein the gases pass upwardly through the separation zone at a velocity of 2½ to 3½ feet per second.

6. A continuous process of separating a mixture of finely divided solids containing particles of different sizes and densities, which comprises providing an elongated vertical separation zone, providing two fixed vertically spaced beds of solids of a size substantially larger than the largest of the said mixture of said finely divided solids to form a free fluidizing zone therebetween, the last named solids being so disposed and arranged as to provide a plurality of interstitial spaces in said beds of sufficiently large dimensions that said finely divided solids can be fluidized therein, continuously feeding said particles of finely divided material to said free fluidizing zone intermediate the top and bottom of said elongated vertical separation zone, causing a gasiform material to flow upwardly through said elongated separation zone including said spaced beds and free fluidizing zone at a velocity of about 0.3 to 4.0 feet per second to produce a turbulent fluidization of the mixed finely divided solids in the vertical space between said beds, to maintain the particles of finely divided material in the form of a dense fluidized mass in the interstitial spaces of said bed of solids without causing fluidization of said substantially larger sized solids, and to permit particles of greater buoyancy to pass upwardly through said separation zone and particles of less buoyancy to pass downwardly, continuously withdrawing finely divided particles of greater buoyancy from an upper portion of said separation zone and continuously withdrawing particles of less buoyancy from a lower point in said separation zone.

7. A continuous process of beneficiating low grade coal to separate therefrom gangue, slate and similar impurities which comprises, first, feeding crushed raw coal sized to pass through a square mesh screen having openings of the order of ⅛ inch into an elongated vertical separation zone containing two fixed vertically spaced beds of non-fluidized solids having a substantially larger size than the largest particles of said ground raw coal with a free fluidizing zone between said beds, the said substantially larger sized solids being so arranged and disposed as to provide a plurality of interstitial spaces in said beds of sufficiently large dimensions that the crushed raw coal can be fluidized therein, continuously passing the sized coal as a stream into said free fluidizing zone intermediate the beds of larger sized solids, causing a gasiform material to flow upwardly in said elongated separation zone at a velocity of about 0.3 to 4.0 feet per second in order to produce turbulent fluidization of said crushed raw coal in said free fluidizing zone, to maintain the particles of finely divided coal in the form of a dense fluidized mass in the interstitial spaces of said bed of solids without causing fluidization of said substantially larger sized solids, and to permit particles of lesser buoyancy comprising the denser impurities in said coal to pass downwardly through said separation zone and particles of greater buoyancy comprising said coal to pass upwardly, continuously withdrawing finely divided particles of greater buoyancy comprising coal from an upper portion of said separation zone and continuously withdrawing particles of less buoyancy comprising the impurities from a lower point in said separation zone.

8. The method set forth in claim 1 in which the top bed of non-fluidized solids is of greater diameter than the bottom bed of said non-fluidized solids.

WILLIAM W. ODELL.
GEORGE L. MATHESON.

References Cited in the file of this patent

UNITED STATES PATENTS

| Number | Name | Date |
|---|---|---|
| 1,984,380 | Odell | Dec. 18, 1934 |
| 2,374,865 | Haworth | May 1, 1945 |
| 2,444,990 | Hemminger | July 13, 1948 |
| 2,480,670 | Peck | Aug. 30, 1949 |
| 2,512,422 | Fletcher | June 20, 1950 |
| 2,561,396 | Matheson | July 24, 1951 |

FOREIGN PATENTS

| Number | Country | Date |
|---|---|---|
| 299,936 | Great Britain | Nov. 8, 1928 |